US011868834B2

(12) United States Patent
Inoko

(10) Patent No.: US 11,868,834 B2
(45) Date of Patent: Jan. 9, 2024

(54) DIGITAL SIGNAGE SYSTEM, CONTENT PROVISION METHOD, CONTROL DEVICE, AND PROGRAM

(71) Applicant: TEAMLAB INC., Tokyo (JP)

(72) Inventor: Toshiyuki Inoko, Tokyo (JP)

(73) Assignee: TEAMLAB INC., Tokyo (JP)

( * ) Notice: Subject to any disclaimer, the term of this patent is extended or adjusted under 35 U.S.C. 154(b) by 0 days.

(21) Appl. No.: 17/910,621

(22) PCT Filed: Mar. 11, 2021

(86) PCT No.: PCT/JP2021/009912
§ 371 (c)(1),
(2) Date: Sep. 9, 2022

(87) PCT Pub. No.: WO2021/182586
PCT Pub. Date: Sep. 16, 2021

(65) Prior Publication Data
US 2023/0169296 A1 Jun. 1, 2023

(30) Foreign Application Priority Data
Mar. 13, 2020 (JP) .................. 2020-043827

(51) Int. Cl.
G06K 19/07 (2006.01)
G06K 19/077 (2006.01)
(Continued)

(52) U.S. Cl.
CPC . *G06K 19/07707* (2013.01); *G06K 19/06037* (2013.01); *G09F 19/22* (2013.01)

(58) Field of Classification Search
CPC ........ G06K 19/07707; G06K 19/06037; G09F 19/22
(Continued)

(56) References Cited

U.S. PATENT DOCUMENTS 8,866,911 B1 * 10/2014 Sivertsen ............... G06Q 30/02
348/177
9,342,316 B1 * 5/2016 Sivertsen ............... G06F 9/441
(Continued)

FOREIGN PATENT DOCUMENTS

| JP | 2014-17581 A | 1/2014 |
| JP | 2018-169504 A | 11/2018 |

OTHER PUBLICATIONS

International Search Report issued in International Bureau of WIPO Patent Application No. PCT/JP2021/009912, dated Jun. 15, 2021, along with an English translation thereof.

*Primary Examiner* — Daniel A Hess
(74) *Attorney, Agent, or Firm* — GREENBLUM & BERNSTEIN, P.L.C.

(57) ABSTRACT

A digital signage system displays a plurality of sets of electronic content on a touch panel display so as to be selectable. The system sets a session for accepting the selection of content, accepts the selection of content by the user, and temporarily holds the information about the content selected by the user during the session. After the selection of content, the system creates access information for collectively accessing the held content, issues a two-dimensional code that is based on the access information and can be read using the user's mobile terminal, and displays the two-dimensional code on the touch panel display.

7 Claims, 5 Drawing Sheets

(51) Int. Cl.
*G06K 19/06* (2006.01)
*G09F 19/22* (2006.01)

(58) Field of Classification Search
USPC .......................................... 235/492
See application file for complete search history.

(56) References Cited

U.S. PATENT DOCUMENTS

| | | | | |
|---|---|---|---|---|
| 2014/0236717 | A1* | 8/2014 | Tsuchiya | G06Q 30/0261 |
| | | | | 705/14.58 |
| 2014/0337004 | A1* | 11/2014 | Maity | G06F 9/4416 |
| | | | | 703/25 |
| 2015/0186921 | A1* | 7/2015 | Want | H04W 4/00 |
| | | | | 705/14.4 |
| 2016/0117735 | A1* | 4/2016 | Mongeau | G06Q 30/0267 |
| | | | | 705/14.64 |
| 2017/0364956 | A1* | 12/2017 | Dhar | H04L 63/102 |
| 2018/0300761 | A1* | 10/2018 | Pittman | G06Q 30/0269 |
| 2018/0357681 | A1* | 12/2018 | Sullivan | G06F 1/1647 |
| 2019/0020479 | A1* | 1/2019 | Antipa | H04W 12/08 |

\* cited by examiner

Fig.1
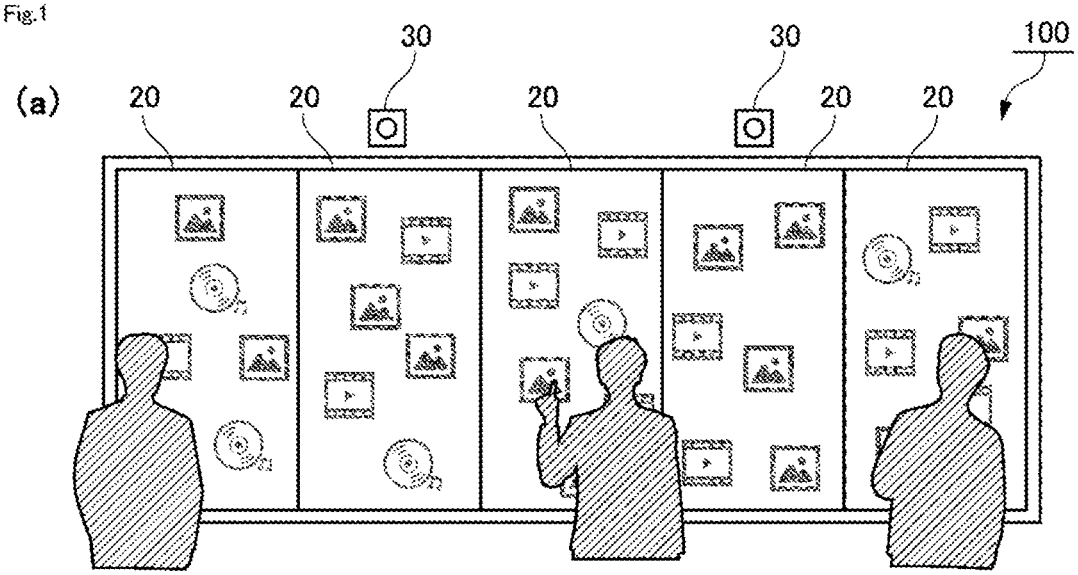
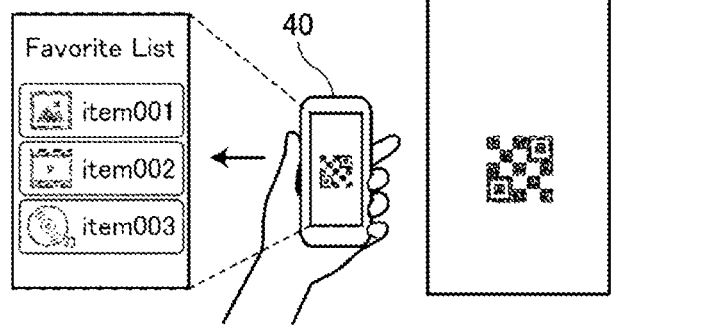

Fig.5
(a)
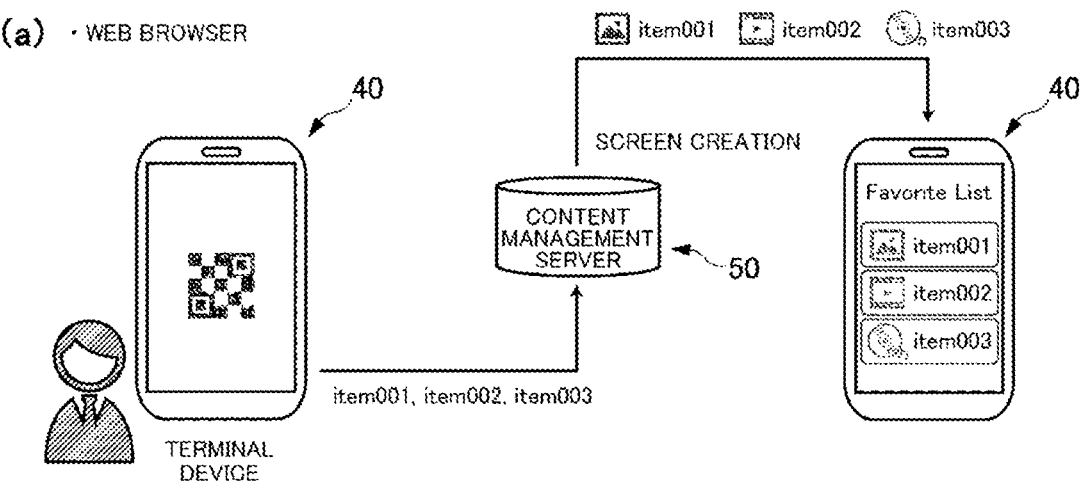
(b)
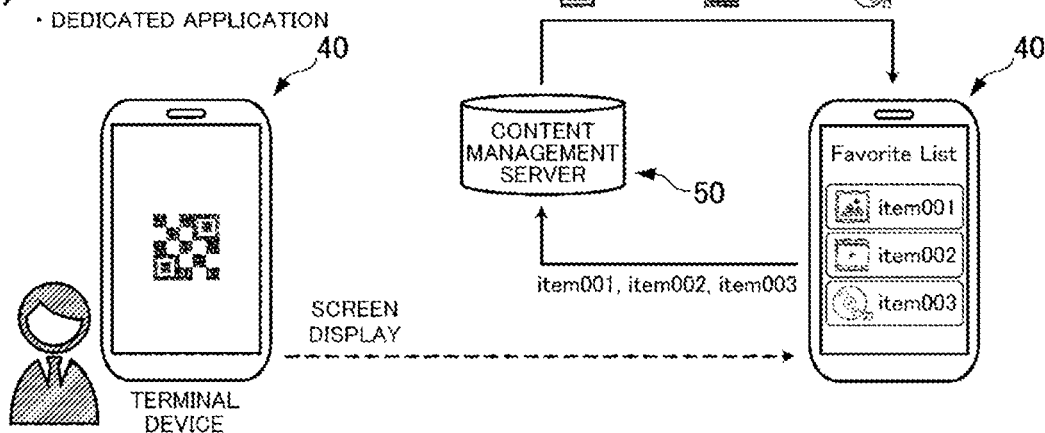
(c)
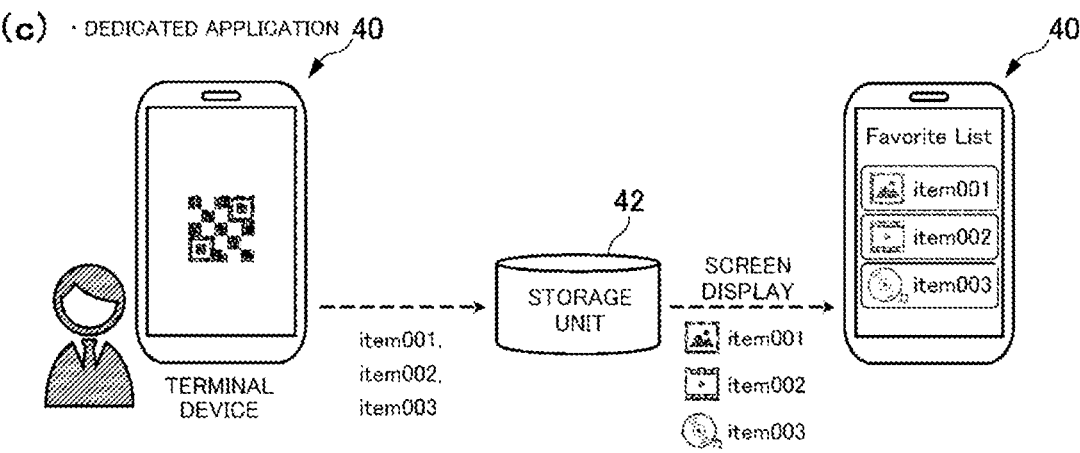

DIGITAL SIGNAGE SYSTEM, CONTENT PROVISION METHOD, CONTROL DEVICE, AND PROGRAM

TECHNICAL FIELD

The present invention relates to a digital signage system, a content provision method, a control device, and a computer program. Specifically, the system according to the present invention intends to enable users to select an arbitrary content from a plurality of electronic contents displayed on a display and enable the users to freely browse the selected content on their own terminal devices.

BACKGROUND ART

A digital signage system that can display a two-dimensional code (for example, a QR code (registered trademark)) on an electronic signboard configured by a display and can provide each user who has read this code by a portable terminal with a coupon image indicating the benefits such as product discount is conventionally known (see Patent Literature 1). Since embedding access information such as URL in a two-dimensional code is feasible, users can be provided with not only coupon images but also electronic contents such as images, videos, music, and map information.

CITATION LIST

Patent Literature

Patent Literature 1: Japanese Patent Application Laid-Open Publication No. 2018-169504

SUMMARY OF INVENTION

Technical Problem

By the way, the conventional digital signage system disclosed in Patent Literature 1 is intended to display a two-dimensional code in advance on the display. Therefore, it can be said that users are solely provided with the content selected by the system side or the store side. Therefore, there is no room for each user to arbitrary select an intended content and accordingly there is a problem that this system is not satisfactory in view of bidirectionality (interactivity).

Further, it is conceivable to build a mechanism for assigning a two-dimensional code for each of multiple contents in advance and displaying, when a user selects an arbitrary content, the two-dimensional code assigned to this content on a display. However, in that case, if the user wishes to acquire a plurality of contents, the user will be forced to read a plurality of two-dimensional codes one by one. This raises such a problem that the time and effort of the user will increase and the at-a-glance visibility of contents will not be satisfactory.

Therefore, the present invention intends to realize a digital signage system that can provide users with desired contents easily and collectively.

Solution to Problem

As a result of diligent studies for the countermeasure solving the above-described problems of the prior art, the inventor of the present invention determines displaying a plurality of electronic contents to allow selection of the contents, successively retaining contents selected by each user during a session period under predetermined conditions, creating access information in order to collectively access the retained contents, and issuing a two-dimensional code or the like from the access information. As a result, by scanning the two-dimensional code with a terminal device, each user can easily and collectively acquire arbitrarily selected contents. Then, the present inventor comes up with the thought that the problems of the prior art can be solved based on the above findings, and the present invention has been completed. Specifically, the present invention has the following configurations and steps.

A first aspect of the present invention relates to a digital signage system. The digital signage system according to the present invention includes display means, session management means, retainment means, access information creation means, and code issuance means. The display means display a plurality of electronic contents to allow selection of the contents. The electronic contents are not limited particularly in their types, and include electronic creations such as images, videos, music, maps, books, coupons, games, and programs, for example. The display means is configured by one or more display devices. The session management means manages a session that accepts selection of the content. The session is, for example, started in response to a user's content selection operation, and is terminated when the selection operation ends, when the user leaves, or when a predetermined period of time has elapsed. The input means accepts selection of the content by a user. The input means may be an input device such as a touch panel, which is integrated with a display, or may be an input device such as a mouse or a keyboard, which is separate from the display. The retainment means retains information on the content selected by the user during the session, at least temporarily. The access information creation means creates access information in order to access the content retained by the retainment means. Examples of the access information include URL indicating the address of a web server on the Internet that stores contents and path information indicating the location of a file or directory that stores contents. The code issuance means creates a code readable by an external device (mainly, a user's terminal device) from the access information. Examples of the code include one-dimensional codes such as barcodes and two-dimensional codes such as QR codes (registered trademark). The code issued by the code issuance means may be displayed on the display means or may be printed on a printing paper by a printer. The above-described configuration enables users to easily access one or more contents selected on the display by reading the code on their own terminal devices. Further, since the provision of multiple contents to the user's terminal device is collectively performed, a list of contents desired by the user can be displayed.

In the digital signage system according to the present invention, it is preferable that the display means and the selection means are configured by a plurality of touch panel displays. Specifically, it is preferable to arrange a plurality of touch panel displays in parallel so as to form a single large display surface. In this case, the session management means may manage the session for each individual touch panel display. It is assumed that users basically operate one touch panel display when selecting the content displayed on the display surface. Therefore, managing the session for each touch panel display facilitates collectively retaining multiple contents arbitrarily selected by one user.

In the digital signage system according to the present invention, it is preferable that the display means and the input means are configured by one or more touch panel displays. In this case, the system according to the present invention may further include a motion sensor that detects a user in close proximity to the touch panel display. Further, the session management means may manage the session for each user detected by the motion sensor. In the present invention, a situation where the content displayed on the touch panel display is simultaneously selected by two or more persons is assumed. In this case, setting the session for each user by using the motion sensor that identifies not only each user's standing position but also a touch panel display operated by this user facilitates collectively retaining multiple contents arbitrarily selected by each user. In particular, in a situation where one touch panel display is simultaneously operated by two or more persons, setting the session for each touch panel display is difficult. However, even in this case, using the motion sensor makes it possible to assign the session for each user.

In the digital signage system according to the present invention, the display means may display a plurality of icon images (also referred to as thumbnail images) in which the contents are symbolized or reduced, and the input means may accept selection of the icon image. This makes it easier for users to arbitrarily select one of contents displayed on the display means.

A second aspect of the present invention relates to a content provision method by a digital signage system. The content provision method according to the second aspect can be executed by the digital signage system according to the first aspect. The content provision method includes steps of displaying a plurality of electronic contents to allow selection of the contents, accepting selection of the content by a user, retaining information on the content selected by the user during the session that accepts the selection of the content at least temporarily, creating access information in order to access the retained content, and creating a code readable by an external device from the access information.

A third aspect of the present invention relates to a control device of a touch panel display or the like. The control device according to the present invention includes a content display unit, a session management unit, a selected item retainment unit, an access information creation unit, and a code issuance unit. The content display unit causes a display device to display a plurality of electronic contents to allow selection of the contents. The session management unit manages a session that accepts selection of the content. The selected item retainment unit retains information on the content selected by the user via an input device during the session, at least temporarily. The access information creation unit creates access information in order to access the content retained by the selected item retainment unit. The code issuance unit converts the access information into a code readable by an external device.

A fourth aspect of the present invention relates to a computer program. The program according to the present invention causes a generic computer to function as the control device according to the third aspect. The program may be downloadable via the Internet or may be stored in a recording medium such as a CD-ROM.

Advantageous Effects of the Invention

According to the digital signage system of the present invention, it is possible to easily and collectively provide each content desired by the user.

BRIEF DESCRIPTION OF DRAWINGS

FIG. 1 schematically illustrates the outline of a digital signage system,

DESCRIPTION OF EMBODIMENTS

Figure 2:
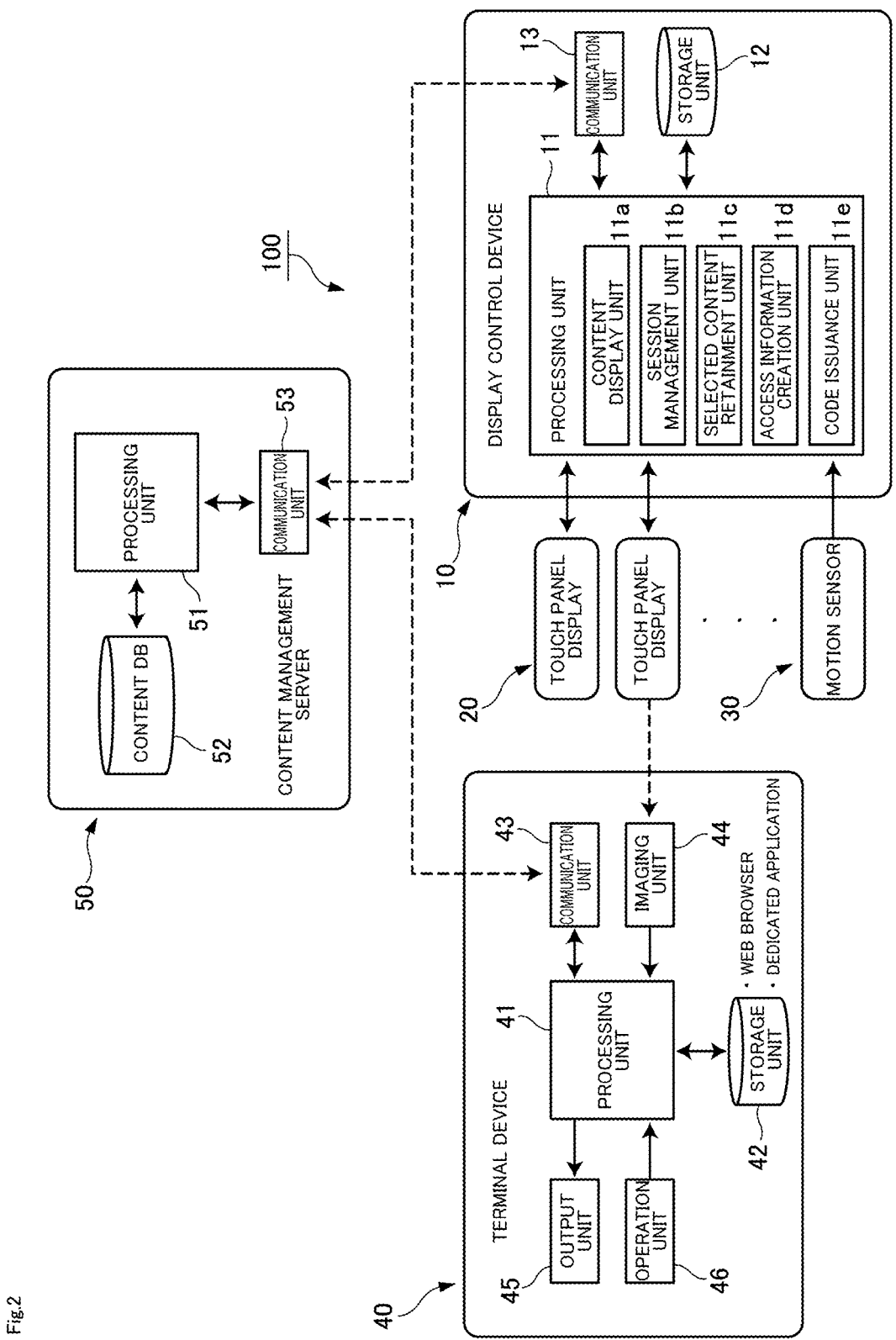
FIG. 2 is a block diagram illustrating a functional configuration of the digital signage system, FIG. 3 schematically illustrates a data structure in a content database.

Hereinafter, embodiments for carrying out the present invention will be described with reference to attached drawings. The present invention is not limited to the forms described below, and includes those appropriately modified from the following forms to the extent apparent to those skilled in the art.

FIG. 1 schematically illustrates the outline of a digital signage system 100 according to an embodiment of the present invention. As illustrated in FIG. 1(*a*), the digital signage system 100 according to the present embodiment builds a single large-sized display configured by a plurality of touch panel displays 20. For example, multiple icons indicating electronic contents such as images, videos, and music are displayed on this large-sized display. In a situation where two or more users are looking at the screen in front of the large-sized display, each user can arbitrarily select an icon of an electronic content displayed on the display. Further, in the present embodiment, a motion sensor 30 is provided in the vicinity of the large-sized display to detect each user in close proximity to the display. Using the motion sensor 30 to detect each user's standing position makes it possible to identify which user is operating which touch panel display 20.

According to the example illustrated in FIG. 1, the large-sized display is configured by five touch panel displays 20. The detection result by the motion sensor 30 indicates that three users exist in front of the large-sized display. At this time, for example, it is assumed that the second user from the left selects a content by operating the third touch panel display 20 from the left. In this case, one session is assigned to the content selection operation by the second user. For example, as illustrated in FIG. 1(*b*), a session ID being unique identification information for identifying the session is set. According to this example, a session ID "monitor3_userB" is set for convenience in order to identify the second user from the left who is operating the third touch panel display 20 from the left. This session continues until fulfilment of a predetermined termination condition. For example, the session may be terminated when the user terminates the content selection operation, when the user leaves the large-sized display, or when a predetermined time has elapsed since the operation by the user is no longer detected.

Further, according to the example illustrated in FIG. 1, the number of contents selected by the user during the continuing session is three. A content ID, which is identification information unique to each content, is assigned to each content. The content ID of the content selected by the user is temporarily retained in association with the session ID. According to the example illustrated in FIG. 1(*b*), three content IDs "item001", "item002", and "item003" are associated and retained with respect to the session ID.

Next, when the content selection operation by the user is completed, the digital signage system 100 creates unique access information in order to collectively access the three contents selected by the user. For example, in the case of accessing these contents with a generic web browser, the digital signage system 100 creates a URL such as "https://****/?item_id=item0001&0002&0003". In the case of accessing these contents using a dedicated application, the digital signage system 100 creates a path such as "****://DIW/scan?item0001&0002&0003". This access information is created for each session and is unique in that it is appropriately variable depending on the content selected during the session.

Next, as illustrated in FIG. 1(c), the digital signage system 100 issues a two-dimensional code such as a QR code (registered trademark) in which the above-described access information is embedded. The two-dimensional code issued in this case is displayed on the touch panel display 20 (specifically, the third display from the left) operated by the user during the session. Then, the user having selected the content operates a terminal device 40 such as his/her own smartphone to read the two-dimensional code displayed on the touch panel display 20. Then, a list summarizing the three contents (item001, item002, item003) selected on the touch panel display 20 is displayed on the terminal device 40. The user can acquire or browse each content from this list. As described above, the digital signage system 100 of the present invention enables each user to easily and collectively access multiple contents selected from a large-sized display with his/her own terminal device 40.

Figure 3:
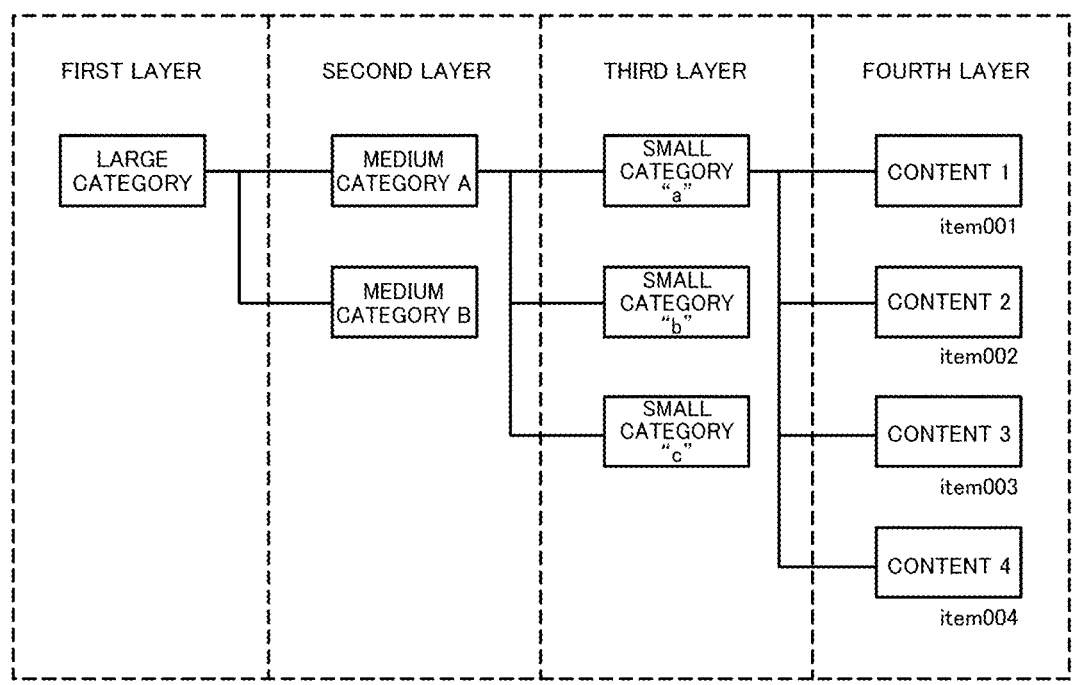
Figure 4:
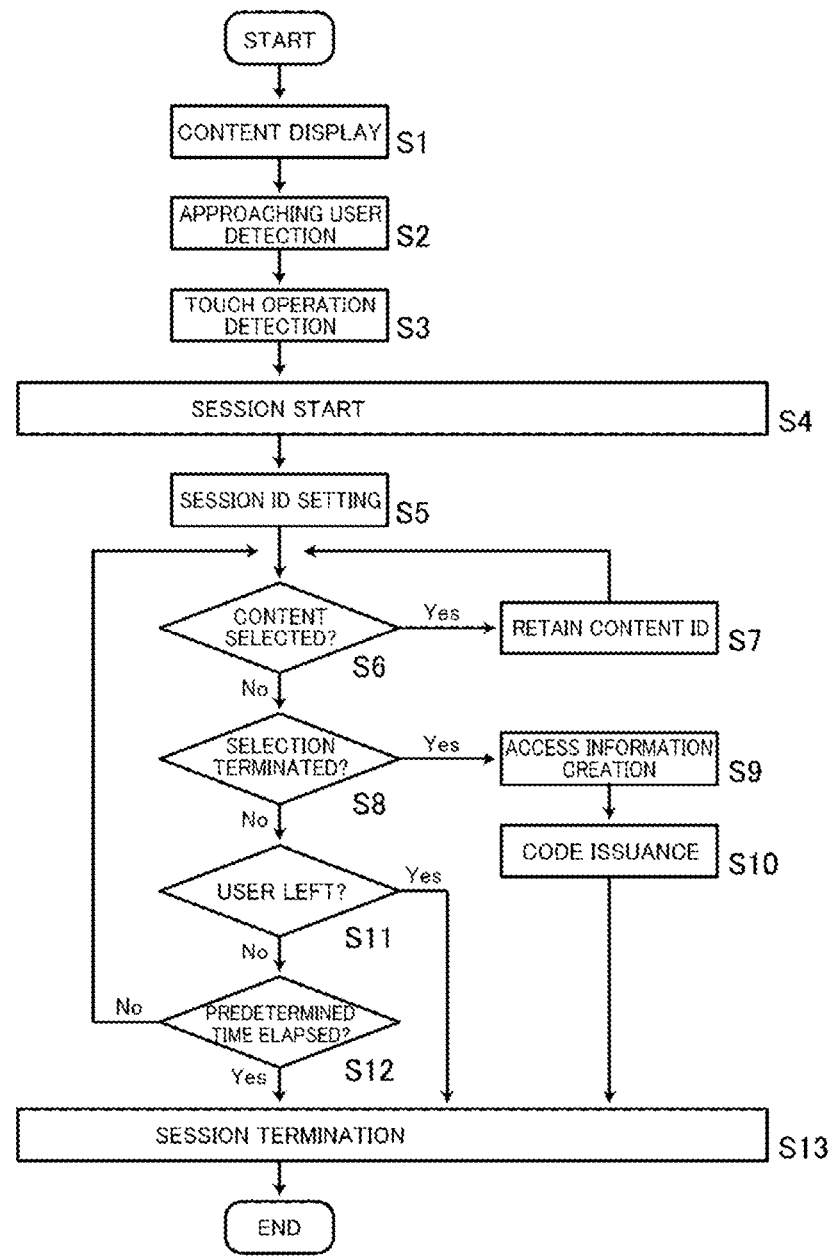
FIG. 4 is a flowchart illustrating exemplary content provision processing by a display control device, and FIG. 5 schematically illustrates a plurality of patterns for enabling a terminal device to perform content acquisition processing.

Subsequently, a specific configuration for realizing the above-described functions of the digital signage system 100 will be described with reference to FIG. 3 to FIG. 5. FIG. 2 illustrates exemplary functional blocks of the digital signage system 100. FIG. 3 illustrates an exemplary data structure of content DB (database). FIG. 4 illustrates exemplary code issuance processing of a display control device 10. FIG. 5 illustrates some patterns for acquiring the content from a two-dimensional code.

As illustrated in FIG. 2, in the present embodiment, the digital signage system 100 includes the display control device 10, the multiple touch panel displays 20, the motion sensor 30, the terminal device 40, and a content management server 50. The content management server 50 is connected to the display control device 10 and the terminal device 40 so as to be able to communicate with each other via a network such as the Internet. The content management server 50 mainly has a content DB 52 and plays a role of providing the display control device 10 and the terminal device 40 with the contents stored in the content DB 52 via a network. However, the content DB 52 can be provided locally in the display control device 10 and the terminal device 40, and in that case, the content management server 50 can be omitted.

The display control device 10 is a computer for controlling the display of the multiple touch panel displays 20. The display control device 10 displays predetermined contents on the multiple touch panel displays 20 to allow selection of the contents, and accepts information about selection of the content entered to the touch panel display 20. Further, the display control device 10 is also connected to the motion sensor 30, and accepts positional information about each user in close proximity to the touch panel display 20 (specifically, distance and direction from the motion sensor 30 to the user, or coordinate information). The display control device 10 basically creates access information for one or more contents selected by the user, and plays a central role of issuing a two-dimensional code in which the access information is embedded. As illustrated in FIG. 2, the display control device 10 includes a processing unit 11, a storage unit 12, and a communication unit 13.

The processing unit 11 of the display control device 10 performs processing for controlling another elements 11 to 13 included in the display control device 10 and the touch panel display 20. An example of the processing unit 11 is a processor such as CPU or GPU. The processing unit 11 executes, according to a computer program stored in the storage unit 12, processing for controlling the display of the touch panel display 20 and processing for issuing the two-dimensional code. In the present embodiment, the processing unit 11 includes a content display unit 11a, a session management unit 11b, a selected content retainment unit 11c, an access information creation unit 11d, and a code issuance unit 11e, as functional blocks. Details of these functional blocks 11a to 11e will be described below with reference to FIG. 4.

The storage unit 12 of the display control device 10 is an element for storing various information to be used when the processing unit 11 performs arithmetic processing or the like. The storage unit 12 stores a program that causes a generic computer to function as the display control device 10 in the present system 100. The storage unit 12 may function as a memory for writing or reading the progress of the arithmetic processing performed by the processing unit 11. For example, content data downloaded from the content management server 50 and information (content ID, other metadata) about the content selected by the user are stored in the storage unit 12. The storage function of the storage unit 12 can be realized, for example, by a non-volatile memory such as HDD or SDD. Further, the memory function of the storage unit 12 can be realized by a volatile memory such as RAM or DRAM.

The communication unit 13 of the display control device 10 is an element for transmitting and receiving information to and from the content management server 50 via a network such as the Internet. Under the control of the processing unit 11, the communication unit 13 can transmit various data to the content management server 50 and can receive various data from the content management server 50.

The touch panel display 20 is a display device for mainly displaying contents and inputting each content selection operation under the control of the display control device 10. Existing products are usable as the touch panel display 20. For example, the touch panel display 20 is provided with a transparent touch panel (input means) on the front surface of the display device (display means) such as a liquid crystal display or an organic EL display. The touch panel is, for example, a conventionally known capacitive sensing, electromagnetic induction, infrared ray, or resistive membrane type, which can detect the touch by a user's finger and obtain its coordinate information. In the present invention, since it suffices that each user can select contents displayed on the display device, the touch panel display 20 may be replaced by display means such as a display device and input means such as a mouse, a keyboard or a trackpad, which are separately provided. Further, in the present invention, as illustrated in FIG. 1(a), it is preferable to arrange multiple touch panel displays 20 so as to build a single large-sized display. Further, in this case, it is preferable that the display control device 10 regards the multiple touch panel displays 20 as one display surface, and controls each touch panel display 20 so that contents and the like can be displayed beyond boundaries of each touch panel display 20. Further, in a case where there are a plurality of touch panel displays 20, a unique display ID is assigned to each touch panel display 20.

The motion sensor 30 is arranged in the vicinity of the touch panel display 20 and acquires positional information of a user who is in close proximity to the touch panel display 20. An example of the motion sensor 30 is an ultrasonic type of sensor. The ultrasonic type of motion sensor 30 transmits ultrasonic waves to a predetermined detection range and receives reflected waves from a detection object (mainly a user), thereby detecting the presence of the detection object and its positional information based on obtained detection results. The motion sensor 30 may be a conventionally known one such as an infrared ray type, an optical type using visible light, a pyroelectric type, an acoustic sensitive type using ultrasonic waves, a pressure sensitive type arranged on a floor, or a combination thereof The terminal device 40 is a portable information communication terminal owned by each user. For example, a smartphone or a tablet-type device can be used as the terminal device. The terminal device 40 has, for example, a processing unit 41, a storage unit 42, a communication unit 43, an imaging unit 44, an output unit 45, and an operation unit 46. The exemplary functional configuration of the terminal device 40 illustrated in FIG. 2 is a generic one. In the present system, it is assumed that multiple terminal devices 40 are present, but each terminal device 40 is not required to have the same configuration, and these terminal devices 40 may be different from each other in configuration.

The processing unit 41 of the terminal device 40 performs processing for controlling other elements 42 to 46 included in the terminal device 40. A processor such as CPU or GPU is usable as the processing unit 41. The processing unit 41 basically reads out a computer program stored in the storage unit 42, and controls other elements according to this program.

The storage unit 42 of the terminal device 40 is an element for storing information to be used in arithmetic processing and the like performed by the processing unit 41. The storage unit 42 stores a program that causes a generic portable information communication terminal to function as the terminal device 40 in the present system. Specifically, in the present system, the terminal device 40 has functions of imaging a two-dimensional code displayed on the touch panel display 20, reading access information embedded in this code, and browsing or acquiring the content. These functions may be executed by a dedicated application program. It may be preferable to prepare a program for each function (imaging function, code reading function, content browsing/acquisition function). Further, the storage unit 42 stores a generic web browser program, and this web browser can be used to browse or acquire the content. Further, the storage unit 42 can also store contents acquired (downloaded) from the content management server 50. The storage function of the storage unit 42 can be realized, for example, by a non-volatile memory such as HDD or SDD. The memory function of the storage unit 42 can be realized by a volatile memory such as RAM or DRAM.

The communication unit 43 of the terminal device 40 is an element for transmitting and receiving information to and from the content management server 50 via a network such as the Internet. Under the control of the processing unit 41, the communication unit 43 can transmit various information to the content management server 50 or can receive various information from the content management server 50.

The imaging unit 44 is a camera for acquiring image data of a still image or a moving image, and is used for reading a two-dimensional code displayed on the touch panel display 20. The image data acquired by the imaging unit 44 is sent to the processing unit 41, subjected to predetermined arithmetic processing, and stored in the storage unit 42. The processing unit 41 may extract, from the two-dimensional code included in the image data, access information embedded therein. The camera is, for example, configured by a lens, a mechanical shutter, a shutter driver, a photoelectric transducer such as a CCD image sensor unit or a CMOS image sensor unit, a digital signal processor (DSP) that reads the amount of charge from the photoelectric transducer and generates image data, and an IC memory.

The output unit 45 is an element for outputting various information to a user who possesses the terminal device 40. The information subjected to the arithmetic processing of the processing unit 41 is output by the output unit 45. Various external output devices used in conventionally known information communication terminals can be adopted as the output unit 45. Examples of the output unit 45 include a display, a speaker, a flashlight, and a vibrator, although the output unit 45 is not limited to them. For example, the output unit 45 may be an output device adopted according to the content, so as to be able to display an image or a video or play music.

The operation unit 46 is an element for accepting input of information from users to the terminal device 40. The information input via the operation unit 46 is transmitted to the processing unit 41. Various input devices used in conventionally known information communication terminals can be adopted as the operation unit 46. Examples of the operation unit 46 include a touch panel, a button, a cursor, a microphone, a keyboard, and a mouse, although the operation unit 46 is not limited to them. Further, the touch panel configuring the operation unit 46 may configure a touch panel display together with a display configuring the output unit 45.

The content management server 50 is a web server for managing content data on the Internet. The content management server 50 may be configured by a single server device or may be built with two or more server devices each taking a partial role in functions. The content management server 50 includes a processing unit 51, the content DB 52, and a communication unit 53. A processor such as CPU or GPU is usable as the processing unit 51 of the content management server 50. The content DB 52 is a database that stores multiple contents while associating each content with a unique content ID. The content DB 52 may additionally store content metadata. The communication unit 53 of the content management server 50 is an element for transmitting and receiving information to and from the display control device 10 and the terminal device 40 via a network such as the Internet.

Further, as illustrated in FIG. 3, the content DB 52 may store each content by categorizing it over a plurality of layers. The example illustrated in FIG. 3 has a four-layered structure of large category, medium category, small category, and content. The content belongs to the small category. The small category belongs to the medium category. The medium category belongs to the large category. Each content or category may belong to only one higher ranked category or may belong to two or more higher ranked categories. For example, content 1 may belong to not only a small category "a" but also a small category "b".

When the database has a layered structure, the display control device 10 causes the touch panel display 20 to display each content according to its category. Specifically, first, one or more large categories are displayed on the display. In response to selection of an arbitrary large category among them, one or more medium categories belonging to the selected large category are displayed. In response to selection of an arbitrary medium category among them, one or more small categories belonging to the selected medium category are displayed. In response to selection of an arbitrary small category, one or more contents belonging to the selected small category are displayed. Categorizing each content in this manner enables users to easily find their favorite contents even when the content DB 52 stores a large number of contents.

Subsequently, two-dimensional code issuance processing of the display control device 10 will be described with reference to FIG. 3. The content display unit 11 a of the display control device 10 causes the touch panel display 20 to display the contents stored in the content DB 52 of the content management server 50 (step S1). The contents may be delivered from the content management server 50 to the display control device 10 in real time, or may be downloaded in advance from to the display control device 10. Here, the content display unit 11a displays each content on the touch panel display 20 so that users can select each content. For example, as illustrated in FIG. 1(a), icon images of multiple contents may be randomly displayed on the multiple touch panel displays 20. Alternatively, as exemplarily illustrated in FIG. 3, each content may be displayed in a categorized form.

Next, when the motion sensor 30 detects a user approaching the touch panel display 20, detection information is input to the display control device 10 (step S2). The session management unit 11b of the display control device 10 identifies the location of the user based on the detection information from the motion sensor 30.

Next, the touch panel display 20 detects a user's touch operation, and detection information is input to the display control device 10 (step S3). At this time, since the detection information of the motion sensor 30 specifies the location of the user, the session management unit 11b can identify which user is operating which touch panel display 20.

The session management unit 11b starts a session in response to detection of a user approaching while the content is displayed and detection of an operation on the touch panel display 20 (step S4). This session continues until the session is completed in step S13 upon fulfilment of predetermined conditions.

After the session starts, first, the session management unit 11b sets unique session ID for a series of content selection operations by the user via the touch panel display 20 (step S5). Examples of the session ID setting method include a first method for identifying only the user who is operating, a second method for identifying only the display being operated, and a third method for identifying both the user and the display. Specifically, the above-described first method includes assigning a session ID such as "userA", "userB", or the like for each user based on the detection information from the motion sensor 30. Further, the above-described second method includes assigning a session ID such as "monitorl", "monitor2", or the like for each touch panel display 20 being operated based on the detection information from the touch panel display 20. Further, the above-described third method includes assigning a session ID such as "monitorl_userA", "monitor2_userB", or the like that can identify both of the user and the touch panel display 20 based on the detection information from the motion sensor 30 and the touch panel display 20. A unique display ID is set to each of the multiple touch panel displays 20, and "monitorl" or the like corresponds to this display ID. In the system of the present invention, it is assumed that two or more users may simultaneously operate one touch panel display 20, or it is assumed that, after one user leaves the touch panel display 20 in the middle of a selection operation, another user may operate the same touch panel display 20. Even in such a case, it is most preferable to set the session ID according to the above-described third method in order to assign an individual session ID to each user's selection operation.

Next, the selected content retainment unit 11c of the display control device 10 determines whether any content displayed on the touch panel display 20 is selected by the user (step S6). When a content is selected by the user, the selected content retainment unit 11c temporarily retains the content ID of this content in association with the session ID (step S7). The content ID may be retained until the end of the session. Further, the user can select multiple contents during one session. When multiple contents are selected, the content ID of each content is retained in association with the same session ID.

Next, the session management unit 11b determines whether the user's content selection operation has been terminated (step S8). For example, a selection termination button may be displayed on the touch panel display 20, and it may be determined that the content selection operation has been terminated when this button is pressed. Further, a predetermined upper limit may be set with respect to the number of selectable contents, and it may be determined that the selection operation has been terminated when the number of selected contents reaches the upper limit.

When one or more contents are selected by the user, and subsequently the selection termination has been confirmed, the access information creation unit 11d of the display control device 10 creates unique access information for collectively accessing the selected contents (step S9). As exemplarily illustrated in FIG. 1(b), the access information may be, for example, a URL or a path including information (mainly content ID or file name of each content) for identifying each selected content. For example, the example of FIG. 1(b) illustrates selected three contents whose content IDs are "item001", "item002", and "item003", respectively. In this case, for example, like "https://****/?item_id=item0001&0002&0003", the directory name of the URL may include these content IDs. The above-described URL includes "****" indicating a domain name (FQDN).

Next, the code issuance unit 11e of the display control device 10 issues a two-dimensional code such as a QR code (registered trademark) to which the access information created by the access information creation unit 11d is given as a parameter (step S10). The code to be issued is not limited to the two-dimensional code. For example, the code issuance unit 11e may issue a one-dimensional code such as a barcode. The two-dimensional code issued by the code issuance unit 11e is usually displayed on the touch panel display 20 that the user is operating. The touch panel display 20 that the user is operating may be identified based on the display ID of the touch panel display 20 included in the session ID or the detection information obtained from the motion sensor 30. Further, the code issuance unit 11e may adopt a method for causing a printer or the like to print the two-dimensional code on a printing paper in order to provide the user with the two-dimensional code.

In response to the issuance of the two-dimensional code by the code issuance unit 11e, the session management unit 11b terminates this session (step S13). Once the session is terminated, the session ID retained in the storage unit 12 and the content ID associated with the session ID may be deleted. Further, it may be possible to retain the session ID and the content ID for a predetermined period of time.

On the other hand, if no content is selected (step S6) after the start of the session (step S4), and further if the selection termination cannot be confirmed (w), the session management unit 11b determines whether the user has left the touch panel display 20 (step S11). Specifically, as long as the location of the same user is continuously detected by the motion sensor 30, it is possible to determine that the user has not left. However, if the detection of the same user is interrupted, it is determined that the user has left. When determining that the user has left, the session management unit 11b terminates this session (step S13). Further, even when the user has not left, if a predetermined time has elapsed without execution of the content selection operation (step S12), the session management unit 11b regards the user as intending to select no content and terminates this session (step S13). The termination time of the session can be set appropriately, although it is preferable to wait for about 1 to 5 minutes.

Subsequently, some methods using the two-dimensional code issued by the display control device 10 in order to access a user selected content will be described with reference to FIG. 5. The aspect illustrated in FIG. 5(a) is a method for acquiring data of each content from the content management server 50 via the web browser of the terminal device 40. As illustrated in FIG. 5(a), upon reading the two-dimensional code, the terminal device 40 accesses the content management server 50 with reference to the URL assigned to this two-dimensional code. Further, this URL includes information (mainly content ID) for identifying one or more contents selected by the user. The content management server 50 refers to the content ID or the like included in the URL, reads out content data matching this content ID from the content DB 52, and transmits the read content data to the terminal device 40. In response to reception of the content data from the content management server 50, the terminal device 40 displays a list of respective contents aggregated in a list format. As a result, the user can collectively access each content selected by himself/herself on the touch panel display 20 from his/her terminal device 40. The content management server 50 may cause the terminal device 40 to download the content data, or may deliver the contents to the terminal device 40 by streaming.

The aspect illustrated in FIG. 5(b) is a method for acquiring content data via an API using the web browser, or a dedicated application, of the terminal device 40. Upon reading the two-dimensional code, the terminal device 40 activates the web browser or the dedicated application according to command information given to this code. Subsequently, the terminal device 40 transmits information (mainly content ID) for identifying the content assigned to the two-dimensional code to the management server 50, via the API. In response to reception of the content ID or the like from the terminal device 40, the management server 50 reads out content data matching this content ID from the content DB 52, and transmits the read content data to the terminal device 40. In response to reception of the content data from the content management server 50, the terminal device 40 displays a list of respective contents aggregated in a list format. Even in this case, the content data can be provided to the terminal device 40 by either download or streaming delivery.

The aspect illustrated in FIG. 5(c) is a method for preliminarily storing all the content data in the terminal device 40 as data of the dedicated application. Upon reading the two-dimensional code, the terminal device 40 activates the dedicated application according to command information given to this code. Further, based on information (mainly content ID) for identifying the content assigned to the two-dimensional code, the terminal device 40 reads out content data from its storage unit 42 and displays a list of respective contents aggregated in a list format. In this case, the portable device 40 can output the content without accessing the Internet. In other words, this is effective to output the content in an environment not connected to the Internet. In this case, since the content DB 52 itself exists in the terminal device 40, the content management server 50 illustrated in FIG. 2 becomes unnecessary.

As described above, in the present specification, in order to express details of the present invention, some embodiments of the present invention have been described with reference to the drawings. However, the present invention is not limited to the above-described embodiments, and encompasses modifications and improvements that are obvious to those skilled in the art based on the matters described in the present specification.

INDUSTRIAL APPLICABILITY

The present invention relates to the digital signage system or the like. Accordingly, the present invention can be used in the advertising industry or in the entertainment industry.

REFERENCE SIGNS LIST

10: display control device
11: processing unit
11a: content display unit
11b: session management unit
11c: selected content retainment unit
11d: access information creation unit
11e: code issuance unit
12: storage unit
13: communication unit
20: touch panel display
30: motion sensor
40: terminal device
41: processing unit
42: storage unit
43: communication unit
44: imaging unit
45: output unit
46: operation unit
50: content management server
51: processing unit
52: content database
53: communication unit
100: digital signage system

The invention claimed is:
1. A digital signage system comprising:
a display for displaying a plurality of electronic contents to allow selection of the contents;
a session manager for managing a session that accepts selection of the content;
an inputter for accepting selection of the content by a user;
a retainer for retaining information on the content selected by the user during the session;
an access information creator for creating access information in order to access the content retained by the retainer; and
a code issuer for creating a code readable by an external device from the access information.

2. The system according to claim 1, wherein
the display and the inputter are configured by a plurality of touch panel displays, and
the session manager manages the session for each individual touch panel display.

3. The system according to claim 1, wherein
the display and the inputter are configured by one or more touch panel displays,
the system further includes a motion sensor that detects a user in close proximity to the touch panel display, and
the session manager manages the session for each user detected by the motion sensor.

4. The system according to claim 1, wherein
the display displays a plurality of icon images in which the contents are symbolized or reduced, and
the inputter accepts selection of the icon image.

5. A content provision method by a digital signage system, comprising:
displaying a plurality of electronic contents to allow selection of the contents;
accepting selection of the content by a user;
retaining information on the content selected by the user during the session that accepts the selection of the content;
creating access information in order to access the retained content; and
converting the access information into a code readable by an external device.

6. A control device comprising:
a content display unit configured to cause a display device to display a plurality of electronic contents to allow selection of the contents;
a session management unit configured to manage a session that accepts selection of the content;
a selected item retainment unit configured to retain information on the content selected by a user via an input device during the session;
an access information creation unit configured to create access information in order to access the content retained by the selected item retainment unit, and a code issuance unit configured to create a code readable by an external device from the access information.

7. A non-transitory computer-readable medium including a program for causing a computer to function as the control device according to claim 6.

* * * * *